United States Patent [19]
Tanaka et al.

[11] Patent Number: 5,712,695
[45] Date of Patent: *Jan. 27, 1998

[54] LIQUID CRYSTAL DISPLAY DEVICE AND FABRICATION PROCESS THEREOF

[75] Inventors: Atsushi Tanaka; Seiichi Mitsui, both of Kashiwa; Shigeru Aomori, Abiko, all of Japan

[73] Assignee: Sharp Kabushiki Kaisha, Osaka, Japan

[ * ] Notice: The term of this patent shall not extend beyond the expiration date of Pat. No. 5,625,474.

[21] Appl. No.: 664,817

[22] Filed: Jun. 17, 1996

[30] Foreign Application Priority Data

Jul. 13, 1995 [JP] Japan ................................. 7-177675

[51] Int. Cl.$^6$ ........................... G02F 1/133; G02F 1/1343
[52] U.S. Cl. ................................................ 349/79; 349/139
[58] Field of Search .............................. 359/53, 59, 60, 359/87; 349/79, 139

[56] References Cited

U.S. PATENT DOCUMENTS

| | | | |
|---|---|---|---|
| 4,878,741 | 11/1989 | Fergason | 359/53 |
| 5,015,074 | 5/1991 | Clerc et al. | 359/53 |
| 5,032,007 | 7/1991 | Silverstein et al. | 359/53 |
| 5,386,307 | 1/1995 | Jang | 359/53 |
| 5,414,545 | 5/1995 | Lee | 359/53 |
| 5,450,222 | 9/1995 | Sirkin | 359/53 |

FOREIGN PATENT DOCUMENTS

| | | | |
|---|---|---|---|
| 60-6925 | 1/1985 | Japan | 359/53 |
| 6-337 643 | 12/1994 | Japan . | |
| 86/05282 | 9/1986 | WIPO | 359/53 |

OTHER PUBLICATIONS

204 Japan Display '83; Color IcdS: Technological Developments by Tatsuo Uchida, May 1983.

IBM Technical Disclosure Bulletin, vol. 28, No. 2 "Crossed Guest–Host Liquid Crystal Display Employing Anisotropic Conductor Plate", Jul. 1985.

Patent Abstracts of Japan, English abstract of JP 6-337 643-A, Kimiaki+/Fujitsu.

*Primary Examiner*—William L. Sikes
*Assistant Examiner*—Tiep H. Nguyen
*Attorney, Agent, or Firm*—David G. Conlin; Milton Oliver

[57] ABSTRACT

A liquid crystal display device comprises: a first substrate formed with a plurality of liquid crystal driving active elements; first, second and third liquid crystal cells stacked in this order on an inter-layer film formed on the first substrate; and a second substrate disposed on the third liquid crystal cell with intervention of a planarizing film; wherein the first, second and third liquid crystal cells each have a counter electrode, a liquid crystal layer and a driving electrode connected to a corresponding one of the liquid crystal driving active elements formed on the first substrate, and are each electrically isolated by an insulating layer from the counter electrode and driving electrode of an adjacent liquid crystal cell.

12 Claims, 12 Drawing Sheets

LIQUID CRYSTAL DISPLAY DEVICE AND FABRICATION PROCESS THEREOF

DETAILED DESCRIPTION OF THE INVENTION

1. Field of the Invention

The present invention relates to a liquid crystal display device and a fabrication process therefor. More particularly, the invention relates to a liquid crystal display device which utilizes the subtractive color method and is suitably embodied in OA (office automation) systems such as word-processor and notebook type personal computer, various visual systems, game systems and the like, and to a fabrication process therefor.

2. Description of the Prior Art

In recent years, rapid developments have been made in applications of liquid crystal display devices to word-processors, laptop personal computers and portable TVs termed "pocket televisions."

Conventionally, liquid crystal display devices use a TN (twisted nematic) mode and an STN (super-twisted nematic) mode. In the TN mode, a liquid crystal display element which is placed between a pair of polarizers, achieves monochromic (black and white) display by utilizing optical characteristics. More specifically, the liquid crystal display element utilizes optical switching characteristics attributable to the optical rotation of a liquid crystal which emerges with no voltage being applied and is negated with a voltage being applied.

For color display, each pixel is generally provided with, for example, red-, blue- and green-color filters each having minute dimensions. By utilizing the aforesaid optical switching characteristics of the TN mode, multi-color or full-color display is achieved by way of the additive color method. The color display is generally achieved by either the additive color method or the subtractive color method. At present, the principle of the additive color method is widely used in color liquid crystal display devices driven by active-matrix addressing or simple-matrix addressing.

One problem presented by such liquid crystal display devices is a low light transmittance on the order of several percent. The light transmittance can be represented by the following equation:

Light Transmittance=Aperture Ratio of TFT Array×Liquid Crystal Transmittance×Polarizer Transmittance×Color Filter Transmittance Typical values of these parameters for a liquid crystal display device currently used are: 60% to 70% for Aperture Ratio of TFT Array; 90% to 95% for Liquid Crystal Transmittance; 40% for Polarizer Transmittance; and 30% for Color Filter Transmittance. The light transmittance calculated based on these values is 6.5% to 8%, which indicates that the majority of back light is not efficiently used. This makes it difficult to achieve color display without using a high-power back light, which deprives the liquid crystal display device of the advantage of low power consumption.

Where color display is achieved by way of the subtractive color method, on the other hand, the use of three liquid crystal cells eliminates the necessity of using the color filters. As a result, Color Filter Transmittance in the foregoing equation is left out of consideration for the subtractive color method, which in principle provides brighter display than the additive color method. Therefore, the subtractive color method is more promising.

FIG. 17 shows an exemplary liquid crystal display device utilizing the subtractive color method. The liquid crystal display device 90 has a multi-layer structure including a first liquid crystal cell 94a, a second liquid crystal cell 95a and a third liquid crystal cell 96a stacked one on another on an inter-layer film 15 formed on a first substrate 7, a planarizing film 26, a black matrix 28 and a second substrate 10. The first liquid crystal cell 94a includes a liquid crystal driving element 91 formed on the inter-layer film 15, a driving electrode 84 connected to the liquid crystal driving element 91, a liquid crystal layer 94 and a counter electrode 85, which are stacked in this order. The second liquid crystal cell 95a includes a substrate 97, a liquid crystal driving element 92 formed on the substrate 97, a driving electrode 86 connected to the liquid crystal driving element 92, a liquid crystal layer 95 and a counter electrode 87, which are stacked in this order. The third liquid crystal cell 96a includes a substrate 98, a liquid crystal driving element 93 formed on the substrate 98, a driving electrode 88 connected to the liquid crystal driving element 93, a liquid crystal layer 96 and a counter electrode 89, which are stacked in this order. The aforesaid three liquid crystal layers each comprise a liquid crystal material such as of guest-host (GH) type and respectively exhibit cyan, magenta and yellow colors. The liquid crystal display device 90 thus constructed is capable of multi-color or full-color display, which is demonstrated in "Next-Generation Liquid Crystal Display Technology", pp.172, Tatsuo Uchida, Kogyo Chosakai of Japan.

However, since the GH-type liquid crystal display device has the three liquid crystal cells, glass substrates or the like are disposed between the respective liquid crystal layers. This results in the offset of three colors due to the thicknesses thereof when the display device is viewed on the skew.

To prevent the color offset, it is necessary to sufficiently reduce the thickness of the substrate relative to the size of each pixel. Where three liquid crystal cells using plastic film substrates are to be stacked one on another, for example, it is difficult in view of limited processing temperatures to form such elements as thin film transistors (TFT) on the plastic film having a low heat resistance. Further, where an active element such as a TFT for driving a liquid crystal layer is to be formed in each of the three liquid crystal cells, the number of steps required to produce the liquid crystal cells is almost tripled in comparison with that currently required, which is extremely disadvantageous in terms of production cost and yield.

To eliminate the disadvantage, Japanese Unexamined Patent Publication No. 6-337643 (1994) proposes a liquid crystal display panel 100 as shown in FIG. 18. The liquid crystal panel 100 includes a plurality of liquid crystal cells 101, 102, and 103 stacked one on another over a plurality of liquid crystal driving elements 110 formed on a first substrate 108. The liquid crystal cells 101, 102 and 103 respectively have driving electrodes 105, 106 and 107 and liquid crystal layers 111, 112 and 113, and use a counter electrode 104 formed only on a second substrate 109 as a common electrode. That is, the liquid crystal layers 111, 112 and 113 are separated from each other only by the driving electrodes 106 and 107. With this arrangement, a glass substrate or the like is not inserted between the liquid crystal cells 101 and 102 nor between the liquid crystal cells 102 and 103, thereby eliminating parallax resulting from the thickness of the glass substrate. However, the sequential stacking of the liquid crystal layers 111, 112 and 113 in the liquid crystal display panel 100 makes it difficult to independently apply an electric field to the liquid crystal layers 111, 112 and 113.

This requires introduction of a complicated driving method such that the potentials of the driving electrodes 105, 106 and 107 are respectively controlled by the corresponding liquid crystal driving elements 110 connected thereto to generate an electric field only in a liquid crystal layer to be driven. As a result, the overall driving voltage is increased because the respective liquid crystal driving elements 110 should be independently controlled. This necessitates the provision of a driver circuit capable of withstanding an increased voltage, resulting in an increased cost for the fabrication of the liquid crystal display device.

SUMMARY OF THE INVENTION

In accordance with one aspect of the present invention, there is provided a liquid crystal display device comprising: a plurality of liquid crystal driving active elements formed on a first substrate; first, second and third liquid crystal cells stacked in this order on an inter-layer film formed on the first substrate; and a second substrate disposed on the third liquid crystal cell with intervention of a planarizing film; wherein the first, second and third liquid crystal cells each have a counter electrode, a liquid crystal layer and a driving electrode connected to a corresponding one of the liquid crystal driving active elements formed on the first substrate, and are each electrically isolated by an insulating layer from the counter electrode and driving electrode of an adjacent liquid crystal cell; and at least one of the liquid crystal layers of the first, second and third liquid crystal cells comprises a liquid crystal dispersed in polymer.

In accordance with another aspect of the present invention, there is provided a process for fabricating a liquid crystal display device, comprising the steps of: (ia) forming a plurality of liquid crystal driving active elements on a first substrate, and forming an inter-layer film on the entire surface of the first substrate including the liquid crystal driving active elements; (iia) forming a first driving electrode connected to a first liquid crystal driving active element, a first liquid crystal layer, and a first counter electrode in this order on the inter-layer film to form a first liquid crystal cell; (iiia) forming a second driving electrode connected to a second liquid crystal driving active element, a second liquid crystal layer, and a second counter electrode in this order on the first liquid crystal cell with intervention of an insulating film to form a second liquid crystal cell; and (iva) forming a third driving electrode connected to a third liquid crystal driving active element, a third liquid crystal layer, and a third counter electrode in this order on the second liquid crystal cell with intervention of an insulating layer to form a third liquid crystal cell, followed by forming a planarizing film on the third liquid crystal cell and placing a second substrate on the planarizing film.

In accordance with still another aspect of the present invention, there is provided a process for fabricating a liquid crystal display device, comprising the steps of: (ib) forming a plurality of liquid crystal driving active elements on a first substrate, and forming an inter-layer film on the entire surface of the first substrate including the liquid crystal driving active elements; (iib) forming a third counter electrode, a third liquid crystal layer, and a third driving electrode in this order on a second substrate with intervention of a planarizing film to form a third liquid crystal cell; (iiib) forming a second counter electrode, a second liquid crystal layer, and a second driving electrode in this order on the third liquid crystal cell with intervention of an insulating layer to form a second liquid crystal cell; (ivb) forming a first counter electrode, a first liquid crystal layer, and a first driving electrode in this order on the second liquid crystal cell with intervention of an insulating layer to form a first liquid crystal cell; and (vb) bonding the resulting first and second substrates together such that the first, second and third driving electrodes are respectively connected to the corresponding liquid crystal driving active elements.

DETAILED DESCRIPTION OF THE PREFERRED EMBODIMENTS

Figure 1:
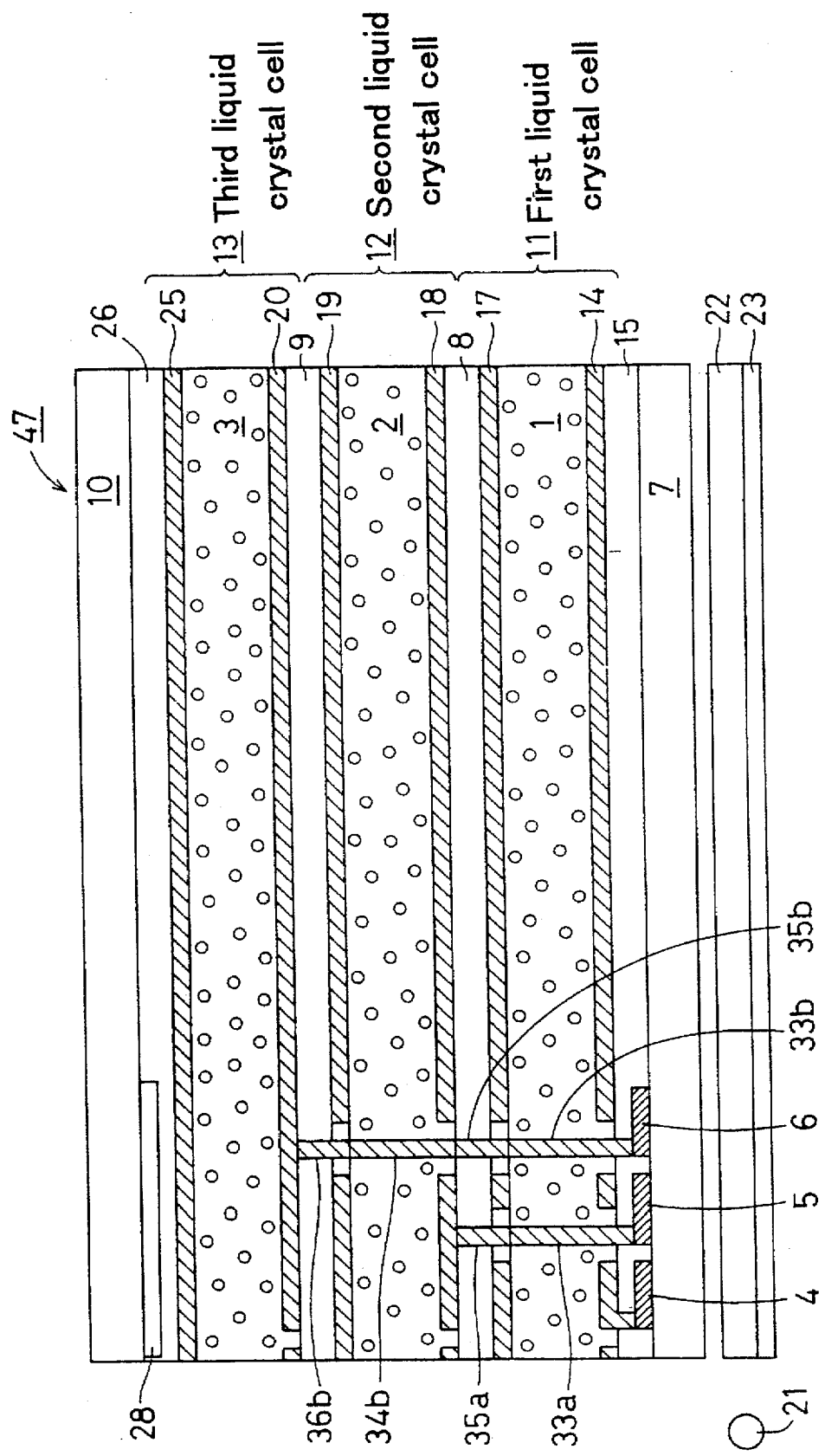
FIG. 1 is a schematic sectional view illustrating the major portion of an exemplary liquid crystal display device according to the present invention.

Where the liquid crystal display device of the present invention is constructed as a reflective liquid crystal display device, a substrate to be used as the first substrate is not particularly limited, but examples thereof include known opaque or transparent insulating substrates such as of silicon, glass, quartz and plastic. The first substrate may have an undercoating film such as of silicon dioxide or SiN formed on a surface thereof. On the other hand, where the liquid crystal display device of the present invention is constructed as a transmissive liquid crystal display device, a transparent insulating substrate is preferably used as the first substrate.

The first substrate is formed with a plurality of liquid crystal driving active elements. The liquid crystal driving active elements to be used are not particularly limited, but examples thereof include non-linear resistor elements such as thin film transistors (TFT) and MIM (Metal Insulator Metal) devices. In the case of the reflective liquid crystal display device, MOS transistors or the like may be used as the liquid crystal driving active elements. The materials for and the size of the active elements may be appropriately determined depending on the function or size of a liquid crystal display device to be fabricated.

The first, second and third liquid crystal cells are stacked in this order on an inter-layer film formed on the first substrate including the liquid crystal driving active elements. Insulating films are respectively interposed between the first and second liquid crystal cells and between the second and third liquid crystal cells for electrical isolation. The inter-layer film is preferably a single- or multi-layer film such as formed of $SiO_2$ or SiN having a thickness of about 0.1 μm to about 3 μm. The insulating film to be used is not particularly limited as long as the capacitance between the respective liquid crystal cells can be minimized, but may be formed of a material having a minimum dielectric constant. Examples of specific materials for the insulating film include transparent polymeric materials such as methyl methacrylate, polyethylene terephthalate, polystyrene, polyvinyl chloride and polyethylene, and those that can be used for an insulating substrate. The thickness of the insulating film is preferably about 10 μm to about 200 μm.

The liquid crystal cells each have a driving electrode, a counter electrode and a liquid crystal layer. The driving electrode of one liquid crystal cell is electrically insulated from the driving electrode and counter electrode of the other liquid crystal cell. The driving electrode of the first liquid crystal cell is formed on the inter-layer film, while the driving electrodes of the second and third liquid crystal cells are formed on the insulating layers. The driving electrodes are respectively connected to the corresponding liquid crystal driving active elements on the first substrate. The liquid crystal driving electrodes are each formed of a transparent conductive material such as $In_2O_3$, $SnO_2$ or ITO (Indium Tin Oxide) to a thickness of about 30 nm to about 500 nm, more preferably about 50 nm to about 200 nm. In the case of the reflective liquid crystal display device, the driving electrode of the first liquid crystal cell is preferably formed of a conductive material functioning as a reflector. More specifically, the driving electrode of the first liquid crystal cell is formed of aluminum, silver, platinum, nickel, chromium or the like to a thickness of about 10 nm to about 1 μm, more preferably about 50 nm to about 500 nm. In the case of the reflective liquid crystal display device, the driving electrode of the first liquid crystal cell may be formed of a transparent conductive material. In this case, however, it is required to provide a reflector of the aforesaid conductive material between the first substrate and the first liquid crystal cell, on the outer side of the first substrate or between the driving electrode and liquid crystal layer of the first liquid crystal cell separately from the first liquid crystal driving electrode.

The counter electrodes extend orthogonally to the driving electrodes in a parallel relation with respect to surfaces of the driving electrodes and substrates. The counter electrodes are preferably each formed of the aforesaid transparent conductive material to substantially the same thickness as that of the driving electrodes.

Liquid crystal compositions for the respective liquid crystal layers preferably contain different dyes such as of azo-type, anthraquinone-type, diazo-type, azomethine-type, naphthoquinone-type and perylene-type. More specifically, the liquid crystal compositions preferably contain cyan, magenta, yellow and like dichroic dyes. In this case, a cell spacing (or the thickness of each of the liquid crystal layers) is preferably about 3 μm to about 30 μm. The liquid crystal compositions for the respective liquid crystal layers may contain the same or different liquid crystal materials, but contain different dyes. However, at least one, preferably all of the liquid crystal compositions comprise a liquid crystal dispersed in polymer of guest-host type. The liquid crystal dispersed in polymer contains particles of a liquid crystal with a size of about 0.1 μm to about 20 μm dispersed in a polymer matrix. The liquid crystal dispersed in polymer contains about 20 wt % to 80 wt % (or vol %), preferably 50 wt % to 70 wt %, of the liquid crystal. The liquid crystal to be contained in the liquid crystal dispersed in polymer is not particularly limited, but examples thereof include nematic liquid crystals such as of Schiff's base-type, azo-type, azoxy-type, benzoate-type, biphenyl-type, terphenyl-type, cyclohexyl carbonate-type, phenylcyclohexane-type, pyrimidine-type and dioxane-type and mixture thereof, or ferroelectric liquid crystals such as of phenylpyrimidine-type. Examples of the polymer matrix include acryl resins, methacryl resins, epoxy resins and ultraviolet-curing allyl resins. Preferably, the polymer matrix in the presence of the liquid crystal is, in situ, formed by polymerization of monomers or oligomers of 2-ethylhexyl acrylate, urethane acrylate, butyl acrylate, vinyl alcohol or methyl methacrylate. A photo-curing initiator, a chiral dopant, a surface active agent and like additives may optionally be added to a liquid crystal compositions or a mixture of a liquid crystal composition, the monomer or oligomer. To cause molecules of the dichroic dye to be oriented in the liquid crystal layer, the liquid crystal composition is irradiated with ultraviolet ray for curing of the polymer matrix, while maintained at a temperature (e.g., about 80° C. to about 120° C. at which the liquid crystal is isotropic with application of an electric field for orientation of the dye molecules. In this process, it is preferred to apply an electric field of about 100 kV/cm to about 1000 kV/cm for about 10 minutes to about 60 minutes.

Where the liquid crystal dispersed in polymer is used, the liquid crystal display device of the present invention does not particularly require the provision of an orientation film but, if necessary, the orientation film may be formed depending on the type and properties of the liquid crystal to be used. Further, a protective film and/or an insulating film in a single layer or plural layers may be formed on an upper/lower side of the driving electrode or the counter electrode. The orientation film, the protective film and the insulating film may be formed of $SiO_2$, SiN, $Al_2O_3$, an epoxy resin, a silicone resin, a polyimide resin or a photoresist resin by evaporation, sputtering, CVD, LPCVD, solution-coating or the like. Alternatively, the formation thereof may be achieved by applying a solution or precursor solution of an organic substance by way of spin-coating, dip-coating, screen-printing, roll-coating or the like and then curing the applied material under predetermined conditions (by heating, irradiation and the like). The thicknesses of the orientation film, the protective film and the insulating film are not particularly limited, but can be controlled depending on the size of the liquid crystal display device to be fabricated, the thicknesses of the liquid crystal layer, the driving electrode and the counter electrodes, and the like.

The counter electrodes of the first, second and third liquid crystal cells are connected to the corresponding liquid crystal driving active elements on the first substrate. The interconnection therebetween is achieved, for example, by stereo-interconnections extending through the inter-layer film, the insulating layer and the liquid crystal cell. Specifically, the counter electrode of the first liquid crystal cell is connected to the corresponding liquid crystal driving active element on the first substrate via a stereo-interconnection extending through the inter-layer film formed over the liquid crystal driving active elements. The counter electrode of the second liquid crystal cell is connected to the corresponding liquid crystal driving active element on the first substrate via another stereo-interconnection extending through the inter-layer film, the first liquid crystal cell and the insulating layer. The counter electrode of the third driving liquid crystal cell is connected to the corresponding liquid crystal driving active element on the first substrate via still another stereo-interconnection extending through the inter-layer film, the first liquid crystal cell, the insulating layer, the second liquid crystal cell and the insulating layer. The stereo-interconnections can be formed of the same material as the driving electrode and the transparent counter electrode, or a conductive material such as Al, Ni, Ti, Ta or Ag.

The liquid crystal display device can be fabricated in the following manner.

Step (ia) includes (a) forming a plurality of liquid crystal driving active elements on the first substrate. A known method is employed for the formation of the liquid crystal driving active elements. Where the liquid crystal driving active elements are thin film transistors, for example, the formation thereof can be achieved by forming an active layer of amorphous silicon hydride, then forming gate insulating films and gate electrodes thereon, and forming source/drain regions by ion implantation. Step (ia) further includes (b) forming the inter-layer film over the liquid crystal driving active elements by a known method such as CVD or evaporation. Step (ia) preferably further includes (c) forming contact holes in the inter-layer film on the respective liquid crystal driving active elements, which contact holes are to be used in the subsequent step to form the stereo-interconnections for connecting the driving electrodes of the respective liquid crystal cells to the corresponding liquid crystal driving active elements on the first substrate. The contact holes may be each formed in a desired size by known methods such as photolithographic and etching processes.

In Step (iia), the first liquid crystal cell is formed on the inter-layer film. Step (iia) includes (a) forming the driving electrode (first driving electrod). For the formation of the driving electrode, a material for the driving electrode is deposited on the inter-layer film by sputtering or evaporation and patterned into a desired configuration by photolithographic and etching processes. Where the contact holes have been formed in the preceding step, the contact holes are filled with the material for the driving electrode so that one of the stereo-interconnections is established at this stage to connect the driving electrode to the corresponding one of the liquid crystal driving active elements (first liquid crystal driving active element). Step (iia) preferably further includes (b) forming at least two electrode pads for the other stereo-interconnections connected to the other liquid crystal driving active elements. The electrode pads may be formed simultaneously with the formation of the driving electrode using the same material. Alternatively, the electrode pads may be formed after the formation of the driving electrode using a different material by a known method such as sputtering or electroless plating. When the electroless plating is employed, an Ni film is formed from a NiSO4 solution on an Al material deposited for the formation of the driving electrode, for example. The material to be used is not limited to Al and Ni, but Ti, Ta, Ag or the like may be used. Step (iia) may further include (c) optionally forming an insulating film, a protective film or the like on the driving electrode and then forming the liquid crystal layer (first liquid crystal layer). The formation of the liquid crystal layer is not particularly limited, but may be achieved by a known method such as liquid crystal layer separation, liquid crystal emulsion coating or liquid crystal impregnation. Specifically, a liquid crystal is dispersed in a water-soluble polymer, and the resulting dispersion is then applied onto the driving electrode by means of a bar coater or the like. If necessary, the polymer is polymerized by heating, ultraviolet radiation or electron beam, and then dried. Step (iia) further includes (d) optionally forming a protective film or an insulating film on the resulting liquid crystal layer and forming the counter electrode (first counter electrode)

thereon. The counter electrode can be formed in substantially the same manner as the driving electrode. Step (iia) preferably further includes (e) forming at least two electrode pads for the stereo-interconnections which extend through the first liquid crystal cell to connect the driving electrodes of the second and third liquid crystal cells to the corresponding liquid crystal driving active elements and are isolated from the counter electrode of the first liquid crystal cell. For the formation of the electrode pads, the liquid crystal layer is etched, after the formation of the counter electrode, by a known method such as wet etching, dry etching or oxygen ashing using a resist such as of polysilane or a disilanylene-π-electron-based polymers exhibiting a high resistance to an oxygen plasma to form through-holes, which is then filled with a conductive material. Alternatively, the through-holes may be formed prior to the formation of the counter electrode, and then filled with the material for the counter electrode.

In Step (iiia), the second liquid crystal cell is formed on the first liquid crystal cell with intervention of the insulating layer. Step (iiia) includes (a) forming the insulating film. The insulating film is preferably formed of a transparent polymeric material as described above. The transparent polymeric material is dissolved in such a solvent as chloroform, and the polymer solution is applied on the first liquid crystal cell by means of a bar coater or the like and then dried at a temperature of 50° C. to 200° C., preferably about 100° C., for about 1 minute to 60 minutes. Step (iiia) further includes (b) forming the driving electrode (second driving electrode) on the insulating layer in the same manner as in Step (iia). Step (iiia) preferably further includes (c) forming at least two electrode pads for the stereo-interconnections to be used to connect the driving electrodes of the second and third liquid crystal cells to the corresponding liquid crystal driving active elements (second liquid crystal driving active element) on the first substrate. The electrode pads may be formed prior to the formation of the driving electrode by etching the insulating layer by a known method such as wet etching, dry etching or oxygen ashing to form through-holes and filling the through-holes with the material for the driving electrode. The electrode pads may be formed simultaneously with the formation of the driving electrode by using the same material. Alternatively, the electrode pads may be formed after the formation of the driving electrode by using a different conductive material. At least one of the electrode pads is connected to the driving electrode of the second liquid crystal cell and therefore connected to the corresponding liquid crystal driving active element on the first substrate via the electrode pads formed in the preceding step. On the other hand, the other electrode pad is electrically insulated from the driving electrode of the second liquid crystal cell. Step (iiia) may further include (d) optionally forming an insulating film, a protective film or the like on the driving electrode and then forming the liquid crystal layer (second liquid crystal layer). The liquid crystal layer is formed in the same manner as described above. Step (iiia) further includes (e) optionally forming a protective film or an insulating film on the liquid crystal layer and then forming the counter electrode (second counter electrode) thereon. The counter electrode can be formed in the same manner as the driving electrode. Step (iiia) preferably further includes (f) forming an electrode pad which extends through the first and second liquid crystal cells to connect the driving electrode of the third liquid crystal cell to the corresponding liquid crystal driving active element on the first substrate. The electrode pad may be formed to be isolated from the counter electrode of the second liquid crystal cell in the same manner as in Step (iia).

Step (iva) includes (a) forming the driving electrode (third driving electrode) and the liquid crystal layer (third liquid crystal layer) for the third liquid crystal cell on the second liquid crystal cell with intervention of the insulating layer in the same manner as in Step (iiia). In this step, an electrode pad is preferably formed for the stereo-interconnection connected to the driving electrode in substantially the same manner as in Step (iiia). Consequently, the driving electrode is connected to the corresponding one of the liquid crystal driving active element (third liquid crystal driving active element) on the first substrate via the electrode pads formed in the preceding steps. Step (iva) further include (b) forming the counter electrode (third counter electrode) in the same manner as in Step (iiia) to complete the third liquid crystal cell, and placing thereon the second substrate with intervention of a planarizing film. Alternatively, Step (iva) may include (b) forming the counter electrode (third counter electrode) on a separate second substrate with intervention of a planarizing film, and bonding the resulting second substrate onto the liquid crystal layer (third liquid crystal layer) of the third liquid crystal cell. At this time, a black matrix may optionally be formed between the second substrate and the planarizing film by a known method. The planarizing film is preferably formed of an epoxy resin, an acryl resin, a polyimide resin or the like to a thickness of about 0.5 µm to about 10 µm.

After the foregoing steps are performed, an interconnection between the counter electrodes of the respective liquid crystal cells is established, and the liquid crystal driving active elements are mounted on a driver circuit. Thus, the liquid crystal display device is completed.

In another fabrication process according to the present invention, Step (ib) include forming a plurality of liquid crystal driving active elements on the first substrate in the same manner as in Step (ia) described above, and forming the inter-layer film on the entire surface of the first substrate including the liquid crystal driving active elements. At this time, the contact holes are preferably formed in the inter-layer film in the same manner as in Step (ia), and then filled with a conductive material to form bumps to be used for stereo-interconnections connected to the liquid crystal driving active elements.

In this process, the fabrication of the liquid crystal display device follows the steps of the aforesaid fabrication process in the reverse order after the provision of the top substrate. In Step (iib), the third liquid crystal cell is formed on the second substrate with intervention of the planarizing film. The planarizing film can be formed in the same manner as in the step (iva)(b'). The counter electrode (third counter electrode), the liquid crystal layer (third liquid crystal layer) and the driving electrode (third driving electrode) are formed in this order on the planarizing film in the same manner as described above. In this case, also, a protective film or an insulating film in a single layer or plural layers is formed on either or both of the upper and lower sides of the counter electrode or the driving electrode.

In Step (iiib), the counter electrode (second counter electrode), the liquid crystal layer (second liquid crystal layer) and the driving electrode (second driving electrode) are formed in this order on the driving electrode of the third liquid crystal cell with intervention of the insulating layer for formation of the second liquid crystal cell. In this step, the insulating film, the counter electrode, the liquid crystal layer and the driving electrode can be formed in the same manner as described above.

In Step (ivb), the counter electrode (first counter electrode), the liquid crystal layer (first liquid crystal layer) and the driving electrode (first driving electrode) are formed in this order on the driving electrode of the second liquid crystal cell with intervention of the insulating layer in the same manner as described above for formation of the first liquid crystal cell. Where the liquid crystal display device is to be constructed as a reflective liquid crystal display device, an insulating film is preferably formed between the liquid crystal layer and the driving electrode, which insulating film has undulation on a surface thereof in contact with the driving electrode so that the driving electrode is formed with undulation on one face thereof. The undulation on the surface of the insulating film can be formed by a known etching technique or the like. In this case, the undulation preferably has an irregular pattern so that light reflected on the driving electrode does not exhibit biased wavelength characteristics due to diffraction or interference.

In Steps (iib), (iiib) and (ivb), the electrode pads are preferably formed for stereo-interconnections in substantially the same manner as in Steps (iia), (iiia) and (iva) of the foregoing fabrication process.

In Step (vb), the resulting first and second substrates are bonded together so that the liquid crystal driving active elements are connected to the corresponding driving electrodes. Where bumps corresponding to the respective liquid crystal driving active elements on the first substrate have been formed in the preceding step, the bumps are preferably connected to the electrode pads formed in the preceding step via an anisotropic conductive film. Thus, the liquid crystal driving active elements can respectively be connected to the driving electrodes of the first, second and third liquid crystal cells via the electrode pads and the bumps. The conductive film to be used is formed of a thermosetting resin such as an epoxy resin, a phenyl resin, a melamine resin, a silicone resin, a polyester resin or a polyimide resin containing generally-spherical conductive particles with a diameter of about 3 µm to about 10 µm. The electrode pads or the driving electrodes can be electrically connected to the bumps by applying a pressure of about 10 g to about 50 g/pad at a temperature of about 100° C. to about 200° C.

Where the liquid crystal display device of the present invention is constructed as a transmissive liquid crystal display device, a back light, a reflective film and the like may optionally be provided on an opposite side of the first substrate to the liquid crystal cells.

The liquid crystal display device and the fabrication process therefor according to the present invention will hereinafter be described by way of embodiments thereof.

EMBODIMENT 1

Figure 2:
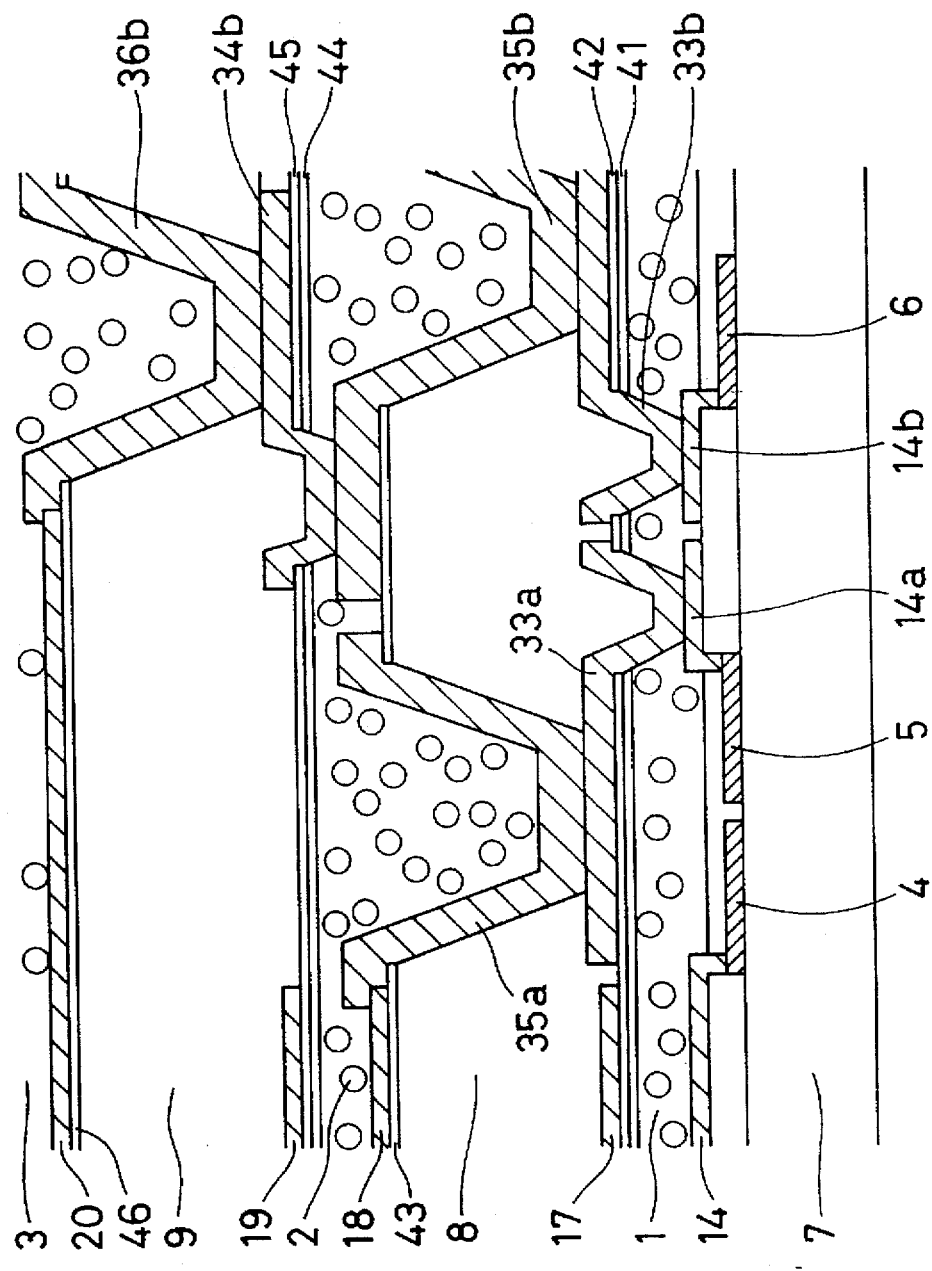
FIG. 2 is an enlarged schematic sectional view illustrating the major portion of the liquid crystal display device of FIG. 1 for explanation of vertical interconnections provided therein.

FIG. 1 is a sectional view illustrating one pixel of a transmissive liquid crystal display device driven by active-matrix addressing and using the subtractive color method for color display. FIG. 2 shows vertical interconnections in the device.

The liquid crystal display device 47 includes a first glass substrate 7 and liquid crystal driving active elements 4, 5 and 6 such as thin film transistors (TFTs) formed on the first substrate 7 in correspondence to driving electrodes for driving respective liquid crystal layers (which will be described later).

In a first liquid crystal cell 11, a driving electrode 14 is formed on an inter-layer film 15 covering the liquid crystal driving TFTs 4, 5 and 6, and connected to the liquid crystal driving TFT 4. A first liquid crystal layer 1 is formed on the driving electrode 14, and a protective film 41, an SiO$_2$ film 42 and a counter electrode 17 are formed on the first liquid crystal layer 1.

In a second liquid crystal cell 12, a driving electrode 18 is formed on the counter electrode 17 with intervention of an insulating layer 8 and an SiO₂ film 43, and connected to the liquid crystal driving TFT 5. A second liquid crystal layer 2 is formed on the driving electrode 18, and a protective film 44, an SiO₂ film 45 and a counter electrode 19 are formed on the second liquid crystal layer 2.

In a third liquid crystal cell 13, a driving electrode 20 is formed on the counter electrode 19 with intervention of an insulating film 9 and an SiO₂ film 46, and connected to the liquid crystal driving TFT 6. A third liquid crystal layer 3 is formed on the driving electrode 20, and a counter electrode 25 is formed on the third liquid crystal layer 3.

A second substrate 10 is disposed on the counter electrode 25 with intervention of a planarizing film 26 and a black matrix 28.

The first, second and third liquid crystal layers 1, 2 and 3 comprise liquid crystal compositions which contain a microcapsuled guest-host liquid crystal dispersed in a polymer matrix, and yellow, magenta and cyan dichroic dyes, respectively. A light guiding plate 22 and a reflective film 23 are disposed on an opposite side of the first substrate 7 to the liquid crystal cells 13, 12 and 11 to deliver illumination from a back light source 21.

The vertical interconnections will next be described in detail with reference to FIG. 2.

The driving electrode 14 is connected directly to the liquid crystal driving TFT 4 formed on the first substrate 7. The driving electrode 18 is connected to the liquid crystal driving TFT 5 via electrode pads 14a, 33a and 35a. The driving electrode 20 is connected to the liquid crystal driving TFT 6 via electrode pads 14b, 33b, 35b, 34b and 36b.

Although the structures of the liquid crystal driving TFTs 4, 5 and 6 are not shown in FIGS. 1 and 2, gate electrodes thereof are formed on the first substrate 7, and active layers thereof are respectively formed on the gate electrodes with intervention of gate insulating films. Respective source/drain electrodes thereof are formed on opposite ends of the active regions.

The liquid crystal display device 47 was fabricated in the following manner.

Figure 3:
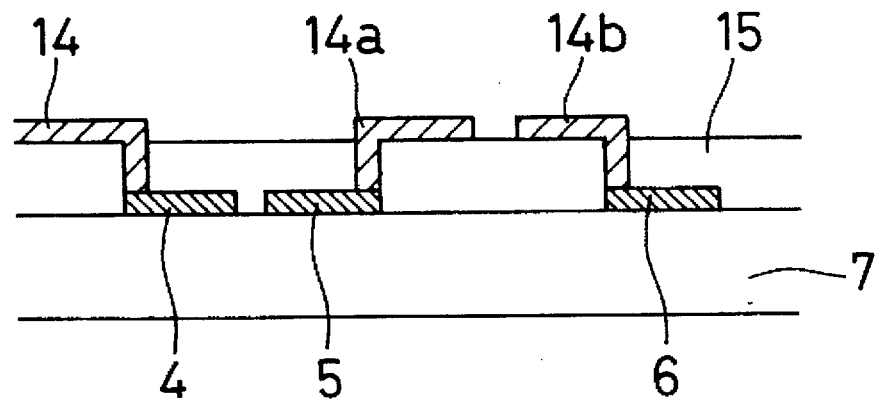
FIGS. 3 to 8 are schematic sectional views illustrating respective steps of a fabrication process for the liquid crystal display device of FIG. 1.

As shown in FIG. 3, the TFTs 4, 5 and 6 each including an active layer of amorphous silicon hydride (a-Si:H) were formed as the liquid crystal driving active elements on the transparent first substrate 7 of soda glass such as Corning #7059 provided with an undercoating film of silicon dioxide by a known technique. Thereafter, an SiO₂ film having a thickness of about 500 nm was formed as the inter-layer film 15 over the TFTs 4, 5, and 6. Then, contact holes were formed in desired regions of the inter-layer film 15, and an ITO film having a thickness of about 100 nm was formed on the entire surface of the inter-layer film 15 including the contact holes by sputtering and then patterned by photolithographic and etching processes to form the transparent driving electrode 14 connected to the TFT 4 via one of the contact holes and to form the electrode pads 14a and 14b connected to the TFTs 5 and 6, respectively.

Subsequently, 15 g of 12% aqueous solution of polyvinyl alcohol (PVA) with a polymerization degree of about 500 containing 1 g of a surface active agent TWEEN®20 (available from ICI America Ltd.) was mixed with 9 g of a nematic liquid crystal ZLI-3561-000 (available from Merck & Co., Inc.) containing 3 wt % of a dichroic dye (any one of cyan, magenta and yellow dyes, e.g., a yellow dye G232 available from Nippon Kankoh Shikiso Kenkyusho Co., Ltd.). The resulting mixture was stirred for about 10 minutes at 5000 rpm to be emulsified. Thereafter, 40 g of copolymer latex (containing 25% of resin component) of methyl methacrylate, butyl acrylate and acrylonitrile was added to the mixture, followed by stirring at a low speed of 1000 rpm or less.

Figure 4:
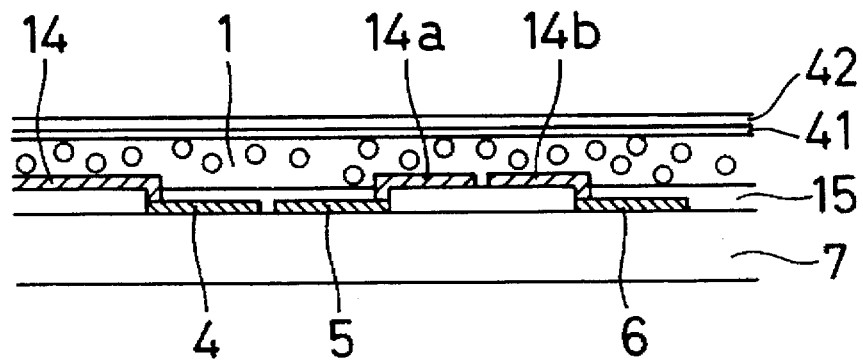

The resulting mixture was then allowed to stand for a while, then applied onto the first substrate 7 formed with the driving electrode 14 to a thickness of about 30 μm by means of a bar coater as shown in FIG. 4, and dried at 60° C. about 1 hour to form the liquid crystal layer 1. The thickness of the liquid crystal layer 1 after drying was about 10 μm. On the first liquid crystal layer 1 thus obtained, the protective film 41 having a thickness of about 1 μm was formed of an epoxy resin, a silicone resin or a polyimide resin by means of a spin coater, bar coater or the like. The SiO₂ film 42 having a thickness of about 100 nm was formed on the protective film 41 at room temperature with use of FSi(OC₂H₅)₃ (fluorotriethoxysilane) by an LPCVD technique (disclosed in Monthly Semiconductor World, 1992.4, pp.41).

Figure 5:
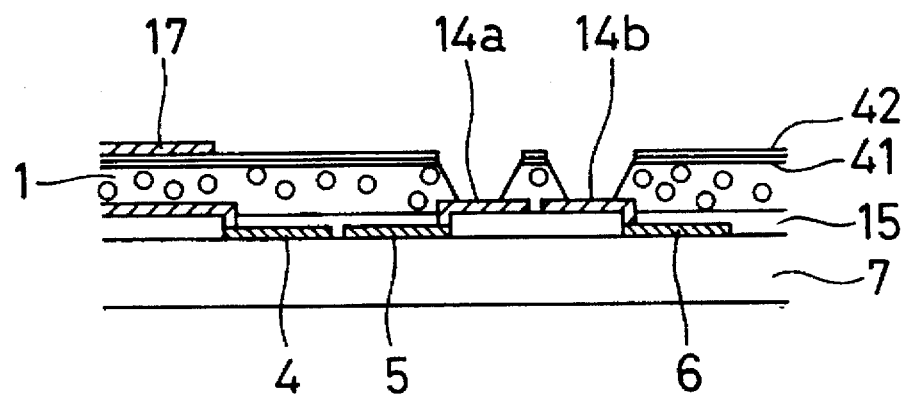

Subsequently, as shown in FIG. 5, an ITO film having a thickness of 200 nm was formed by sputtering, and patterned by ordinary photolithographic and etching processes to form the transparent counter electrode 17. The SiO₂ film 42 was patterned into a desired configuration by ordinary photolithographic and etching processes. Then, through-holes extending to the electrode pads 14a and 14b were formed in the protective film 41 and liquid crystal layer 1 by way of oxygen ashing by using the patterned SiO₂ film 42 as a mask.

Figure 6:
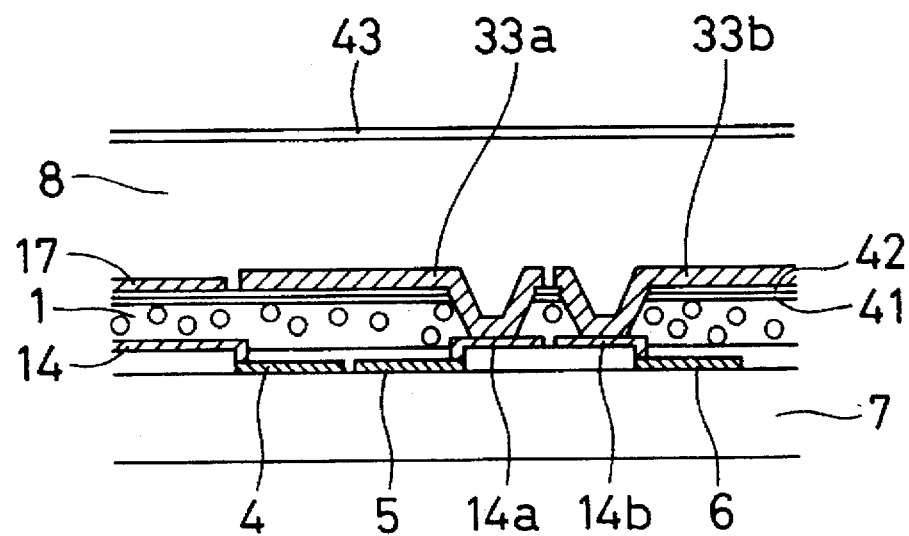

Subsequently, an Al film or the like was formed in a desired region on the SiO₂ film 42 including the through-holes, as shown in FIG. 6. On the Al film, an Ni film was formed from an NiSO₄ solution by an electroless plating technique (see 1989 SYMPOSIUM ON VLSI TECHNOLOGY, 12-2) to form the electrode pads 33a and 33b. Thus, the electrode pads 33a and 33b were connected to the TFTs 5 and 6 via the electrode pads 14a and 14b, respectively.

Next, a chloroform solution of polymethyl methacrylate was applied onto the counter electrode 17 and electrode pads 33a and 33b by means of a bar coater, and dried at 100° C. for about 2 minutes to form the insulating layer 8 having a thickness of about 50 μm. The SiO₂ film 43 having a thickness of 100 nm was formed on the insulating film 8 by sputtering, LPCVD or a like technique.

Figure 7:
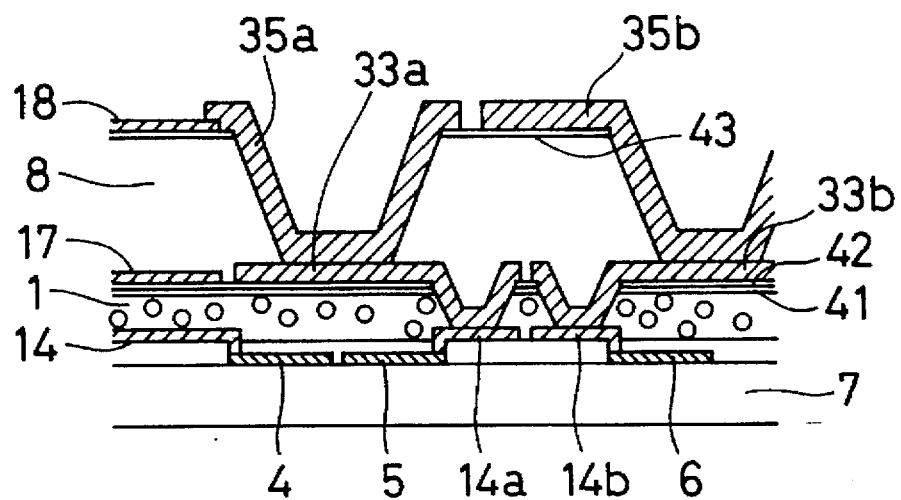

Thereafter, as shown in FIG. 7, an ITO film having a thickness of about 200 nm was formed on the entire surface of the SiO₂ film 43 by sputtering, and patterned by ordinary photolithographic and etching processes to form the driving electrode 18. Subsequently, the SiO₂ film 43 was patterned into a desired configuration by ordinary photolithographic and etching processes. Then, through-holes extending to the electrode pads 33a and 33b were formed in the insulating layer 8 by way of oxygen ashing by using the patterned SiO₂ film 43 as a mask. Next, the electrode pads 35a and 35b were formed in desired regions on the transparent electrode 18 including the through holes by electroless plating in the same manner as described above. Thus, the driving electrode 18 was connected to the TFT 5 via the electrode pads 35a, 33a and 14a.

Figure 8:
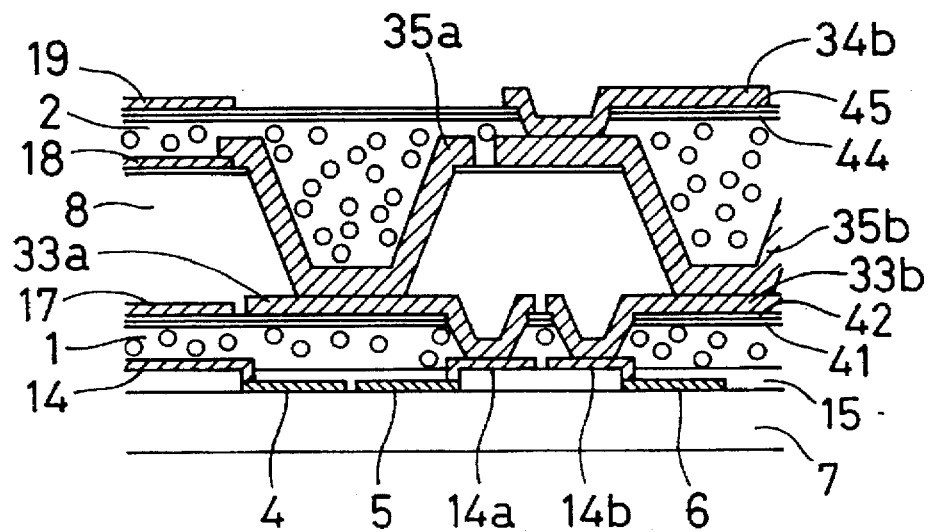

As shown in FIG. 8, the second liquid crystal layer 2 containing a magenta dye was formed in the same manner as described above, followed by the formation of the protective film 44, the SiO₂ film 45, the counter electrode 19 and the electrode pad 34b. Then, the insulating layer 9, the SiO₂ film 46, the driving electrode 20 and the electrode pad 36b were formed in the same manner as described above. Thus, the driving electrode 20 was connected to the TFT 6 via the electrode pads 36b, 34b, 35b, 33b and 14b. Thereafter, the third liquid crystal layer 3 containing a cyan dye was formed in the same manner as described above.

Meanwhile, the black matrix 28 was formed on the second substrate 10 of the same material as the first substrate 7, which was provided as the counterpart of the first substrate 7. The planarizing film 26 was formed of an epoxy resin on the black matrix 28, and then the transparent counter electrode 25 was formed on the planarizing film 26. The resulting second substrate 10 was bonded to the first substrate 7 formed with the first, second and third liquid crystal layers 1, 2 and 3. Thus, the liquid crystal display device 47 shown in FIG. 1 was completed. In the liquid crystal display device 47, the TFTs 4, 5 and 6 were respectively mounted on driver circuits, and the counter electrodes 17, 19 and 25 were connected to a common interconnection (not shown). The light guiding plate 22, the reflective film 23 and the back light source 21 were provided on an opposite side of the first substrate 7 to the liquid crystal layers.

The liquid crystal display device thus obtained is capable of full-color display, since the liquid crystal layers 1, 2 and 3 thereof correspond to yellow, magenta and cyan, respectively, and are driven independently by the respective TFTs 4, 5 and 6. Specifically, a signal from the TFT 6 reaches the driving electrode 20 via the electrode pads 14b, 33b, 35b, 34b and 36b to drive only the liquid crystal layer 3. Likewise, a signal from the TFT 5 reaches the driving electrode 18 via the electrode pads 14a, 33a and 35a to drive only the liquid crystal layer 2, and a signal from the TFT 4 directly reaches the driving electrode 14 to drive only the liquid crystal layer 1.

Since the liquid crystal layers 1, 2 and 3 each comprise the microcapsulated GH liquid crystal dispersed in the polymer matrix, blue-, green- and red-light components of incident light are absorbed by the respective liquid crystal layers 1, 2 and 3 when no electric field is applied thereto. When an electric field is applied to any of the liquid crystal layers, on the other hand, the liquid crystal layer applied with the electric field is switched to a transmissive state. When only the TFT 6 is switched on and the TFTs 4 and 5 are switched off, for example, only the liquid crystal layer 3 is switched to a transmissive state, and the liquid crystal layers 2 and 1 absorb the green- and blue-light components, respectively. Thus, only the red-light component can be extracted to display a red color.

EMBODIMENT 2

Figure 9:
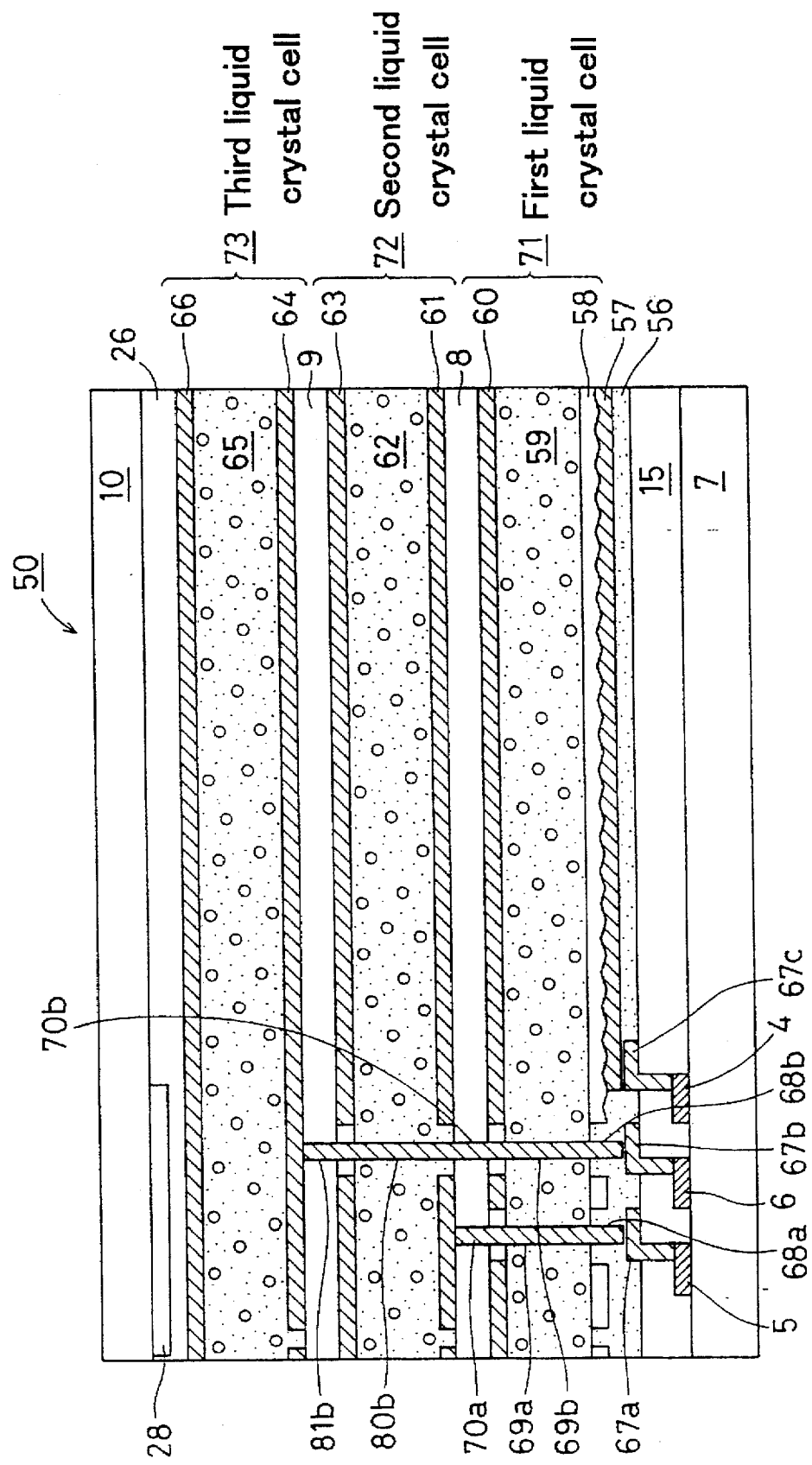
FIG. 9 is a schematic sectional view illustrating the major portion of another exemplary liquid crystal display device according to the present invention.
Figure 10:
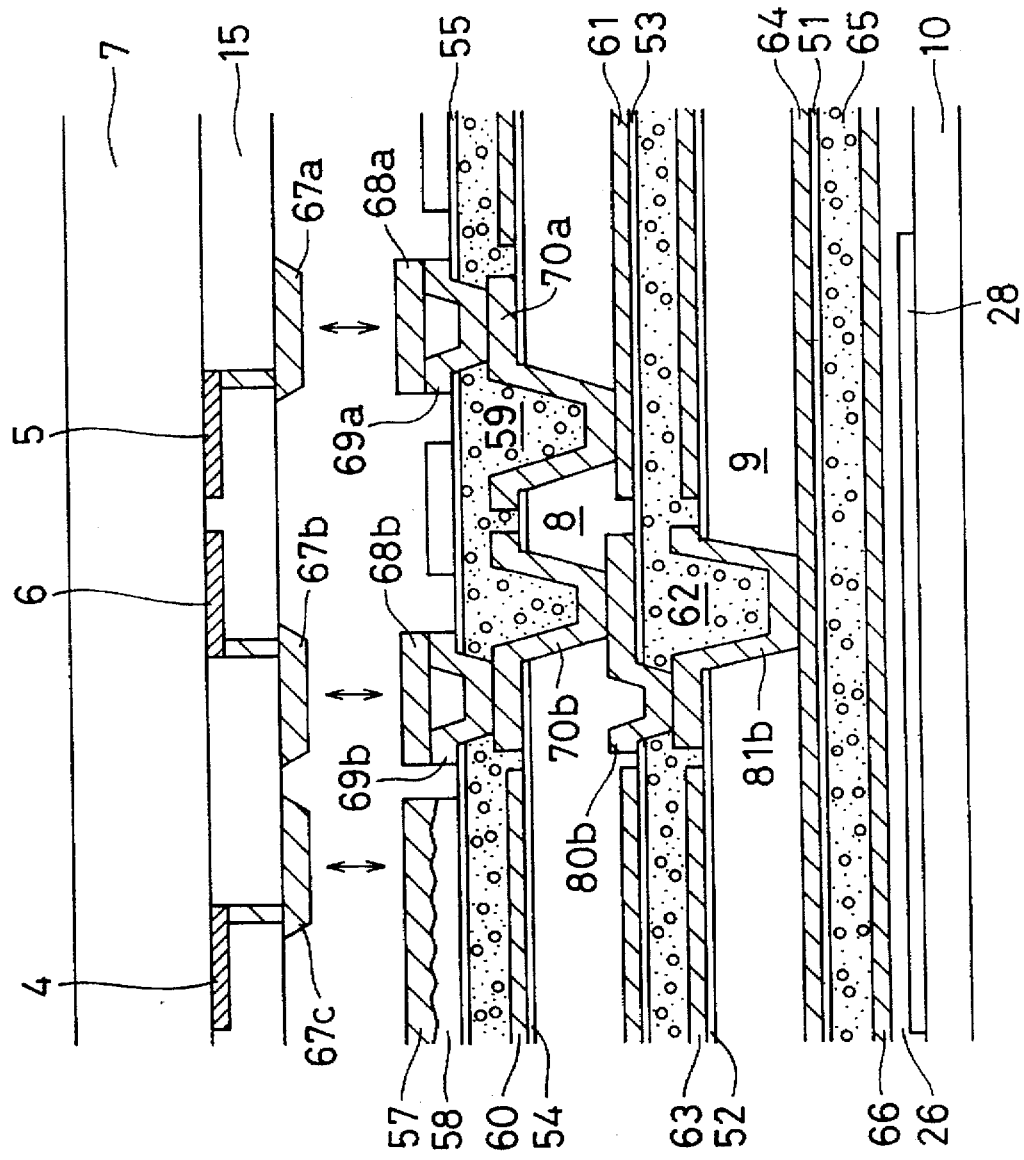
FIG. 10 is an enlarged schematic sectional view illustrating the major portion of the liquid crystal display device of FIG. 9 for explanation of vertical interconnections provided therein.

FIG. 9 is a sectional view illustrating one pixel of a reflective liquid crystal display device driven by active-matrix addressing and using the subtractive color method for color display. FIG. 10 shows vertical interconnections in the device.

Like Embodiment 1, the liquid crystal display device 50 includes liquid crystal driving TFTs 4, 5 and 6 formed on a first substrate 7.

In a first liquid crystal cell 71, a driving electrode 57 is formed over the liquid crystal driving TFTs 4, 5 and 6. with intervention of an inter-layer film 15 and an anisotropic conductive film 56, and is connected to the liquid crystal driving TFT 4. The driving electrode 57 functions as a scattering reflector and has undulation on an opposite surface thereof to the first substrate 7. An insulating film 58, a protective film 55, a first liquid crystal layer 59 and a counter electrode 60 are formed in this order on the liquid crystal driving electrode 57.

In a second liquid crystal cell 72, a driving electrode 61 connected to the liquid crystal driving TFT 5 is formed on the counter electrode 60 with intervention of an $SiO_2$ film 54 and an insulating layer 8. A protective film 53, a second liquid crystal layer 62 and a counter electrode 63 are formed in this order on the driving electrode 61.

In a third liquid crystal cell 73, a driving electrode 64 connected to the liquid crystal driving TFT 6 is formed on the counter electrode 63 with intervention of an $SiO_2$ film 52 and an insulating layer 9. A protective film 51, a third liquid crystal layer 65, and a counter electrode 66 are formed in this order on the driving electrode 64.

A transparent second substrate 10 is provided on the counter electrode 66 with intervention of a planarizing film 26 and a black matrix 28.

Like Embodiment 1, the first, second and third liquid crystal layers 59, 62 and 65 comprise liquid crystal compositions which contain a microcapsulated guest-host liquid crystal dispersed in a polymer matrix, and yellow, magenta and cyan dichroic dyes, respectively.

The vertical interconnections will be described in detail with reference to FIG. 10.

Bumps 67c, 67a and 67b are connected to the liquid crystal driving TFTs 4, 5 and 6, respectively, on the first substrate 7. The liquid crystal driving TFT 4 is connected to the driving electrode 57 via the bump 67c. The liquid crystal driving TFT 5 is connected to the driving electrode 61 via the bump 67a and electrode pads 68a, 69a and 70a. The liquid crystal driving TFT 6 is connected to the driving electrode 64 via the bump 67b and electrode pads 68b, 69b, 70b, 80b and 81b.

The liquid crystal driving TFTs 4, 5 and 6 shown in FIGS. 9 and 10 have the same constructions as in Embodiment 1.

The liquid crystal display device 50 was fabricated in the following manner.

First, the TFTs 4, 5 and 6 serving as liquid crystal driving active elements were formed on the first substrate 7 in the same manner as in Embodiment 1. The inter-layer film 15 was formed over the TFTs 4, 5 and 6, and contact holes were formed in the inter-layer film 15. An Al or Au film having a thickness of 1 μm was formed on the entire surface of the inter-layer film 15 including the contact holes by sputtering, vacuum vapor deposition or a like technique, and then formed into the bumps 67c, 67a and 67b connected to the TFTs 4, 5, and 6, respectively, by photolithographic and etching processes or a lift-off method.

Figure 11:
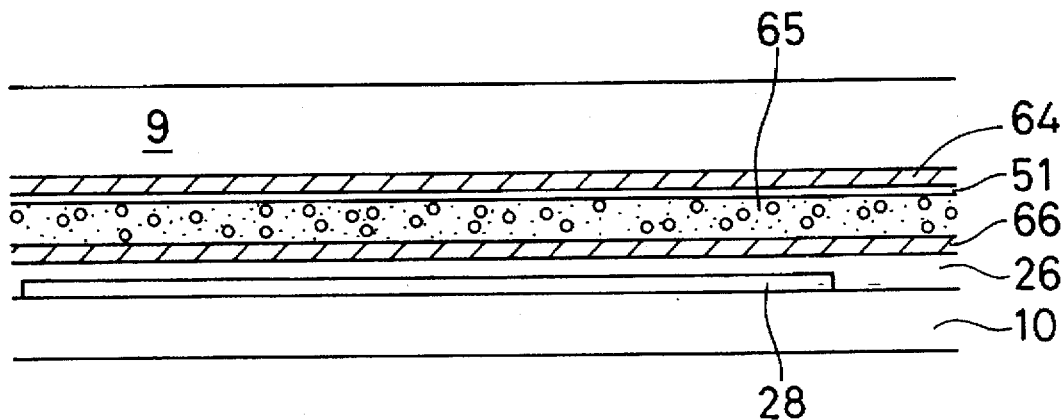
FIGS. 11 to 16 are schematic sectional views illustrating respective steps of a fabrication process for the liquid crystal display device of FIG. 9.

Next, as shown in FIG. 11, the black matrix 28 was formed on the second substrate 10 of the same material as the first substrate 7 by a known method in the same manner as in Embodiment 1, and then the planarizing film 26 of an epoxy resin was formed thereon. Furthermore, an ITO film having a thickness of 200 nm was formed on the entire surface of the planarizing film 26 by sputtering, and patterned into a desired configuration to form the counter electrode 66.

Next, the third liquid crystal layer 65 was formed on the counter electrode 66. The liquid crystal layers according to this embodiment comprised liquid crystal compositions each containing particles of a GH liquid crystal dispersed in a polymer matrix of an ultraviolet-curing resin and a dichroic dye. Molecules of the dichroic dye, which were not incorporated in the liquid crystal particles but remained in the polymer matrix, were oriented by a technique disclosed in Japanese Unexamined Patent Publication No. Hei 5 (1993) -002194 when the polymer matrix was cured, so that light absorption by the dichroic dye was prevented during light transmission.

A liquid crystal material (ES available from BDH) 1.6 g containing 2 wt % of p-type dichroic dye (anyone of cyan, magenta and yellow, e.g., a yellow dye G232 available from Nippon Kankoh Shikiso Kenkyusho Co., Ltd.) was added to a mixture 0.4 g containing butyl acrylate and acryl oligomer (M-1200 available from Toagosei Chemical Industry Co., Ltd.) in a weight ratio of 3:2. Then, a photo-curing initiator (Darocure 1116 available from Merck & Co., Inc.) was added to the resulting mixture, followed by sufficient stirring for dispersion. The second substrate 10 formed with the transparent electrode 66 was coated with the liquid crystal dispersion to a thickness of 10 μm by means of a bar coater.

Next, the liquid crystal coating was maintained at a temperature of 85° C. so that liquid crystal molecules were prevented from being oriented to be kept in an isotropic state, and an electric field of 300 kV/cm was applied across the liquid crystal coating for 30 minutes to orient the molecules of the p-type dichroic dye. With the electric field continuously applied, the liquid crystal coating was irradiated with ultraviolet ray at a luminance of 20 mW/cm² for 2 minutes by means of a mercury lamp to cure the liquid crystal coating. Thus, the liquid crystal layer 65 was formed.

The protective film 51 was formed of a silicone resin or a polyimide resin on the liquid crystal layer 65. Subsequently, an ITO film having a thickness of 200 nm was formed on the protective film 51 by sputtering, and patterned by ordinary photolithographic and etching processes to form the driving electrode 64.

The insulating layer 9 having a thickness of about 50 μm was formed on the entire surface of the driving electrode 64 in the same manner as in Embodiment 1.

Figure 12:
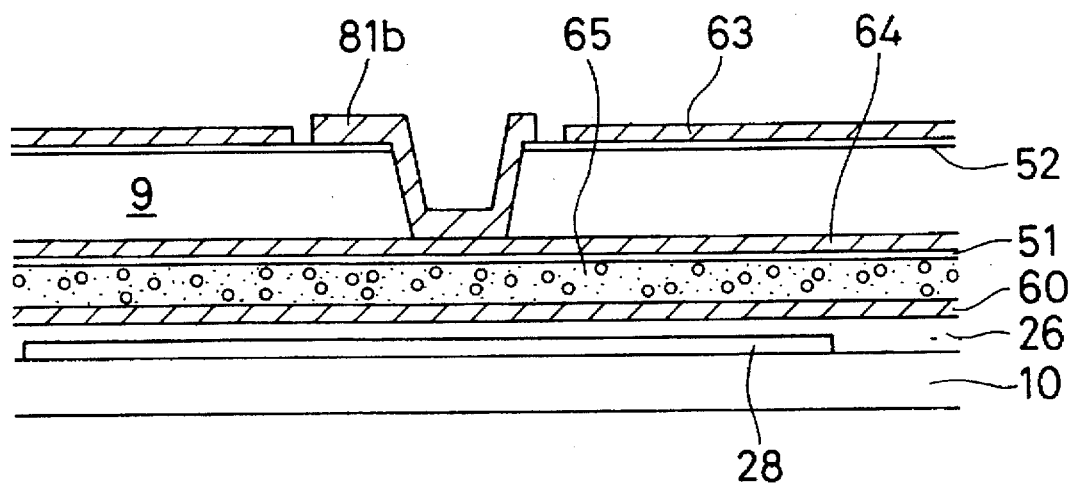

As shown in FIG. 12, the SiO₂ film 52 having a thickness of 100 nm was formed on the insulating layer 9 by sputtering, LPCVD or a like technique. The counter electrode 63 was formed of ITO on the SiO₂ film 52 in the same manner as in Embodiment 1. The SiO₂ film 52 was then patterned to fork a mask, which was used to etch the insulating layer 9 for formation of a through-hole extending to the driving electrode 64. Then, an electrode pad 81b was formed in a region on the SiO₂ film 52 including the through-hole in the same manner as in Embodiment 1.

Figure 13:
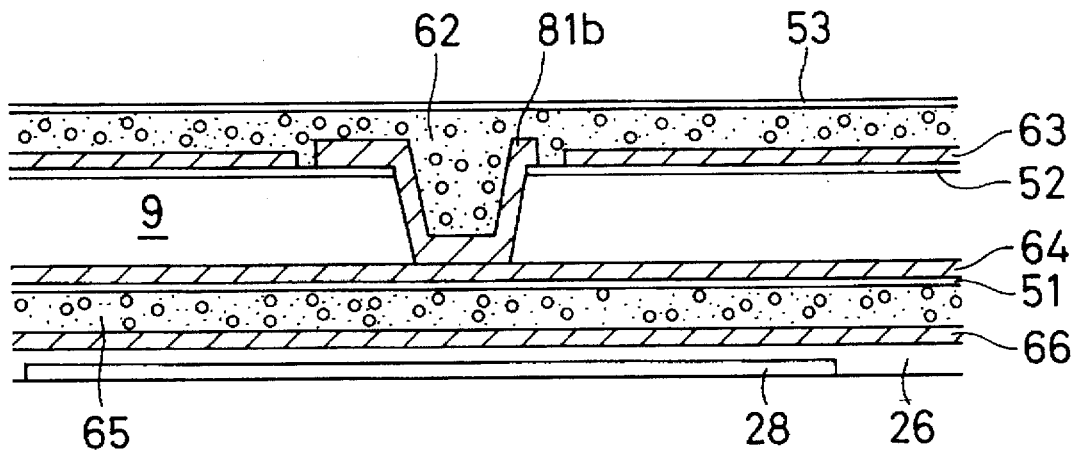

Next, as shown in FIG. 13, the second liquid crystal layer 62 containing a magenta dye was formed on the driving electrode 63 and the electrode pad 81b in the same manner as described above, and then the protective film 53 was formed thereon.

Figure 14:
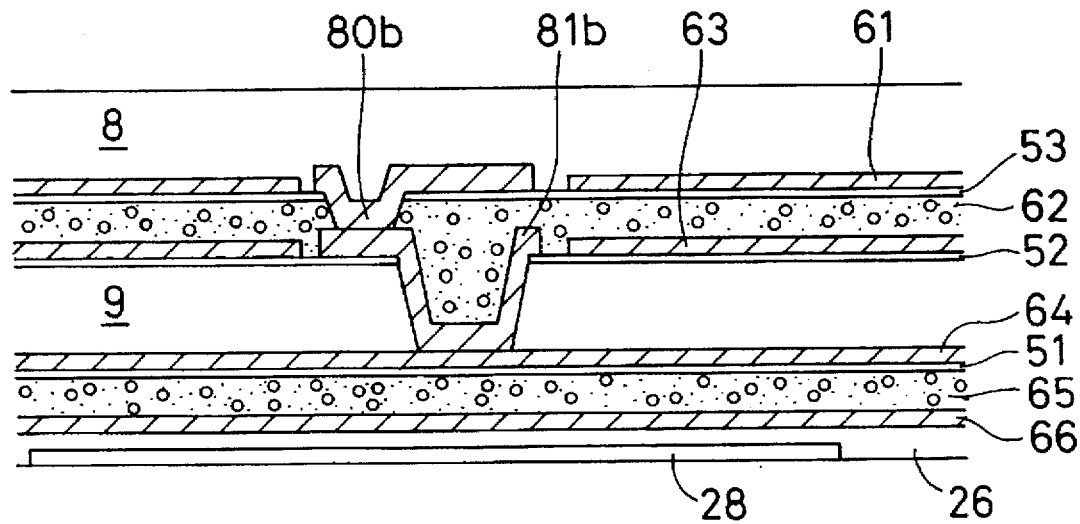

Then, as shown in FIG. 14, the transparent driving electrode 61 was formed on the protective film 53 in the same manner as in Embodiment 1. Thereafter, the liquid crystal layer 65 and the protective film 53 were etched by way of oxygen ashing by using a photoresist such as of photosensitive polysilane or disilanylene-π-electron-based polymer exhibiting a high resistance to oxygen plasma to form a through-hole extending to the electrode pad 81b. The electrode pad 80b was formed in the through-hole in the same manner as in Embodiment 1. Next, the insulating layer 8 was formed in the same manner as in Embodiment 1.

Figure 15:
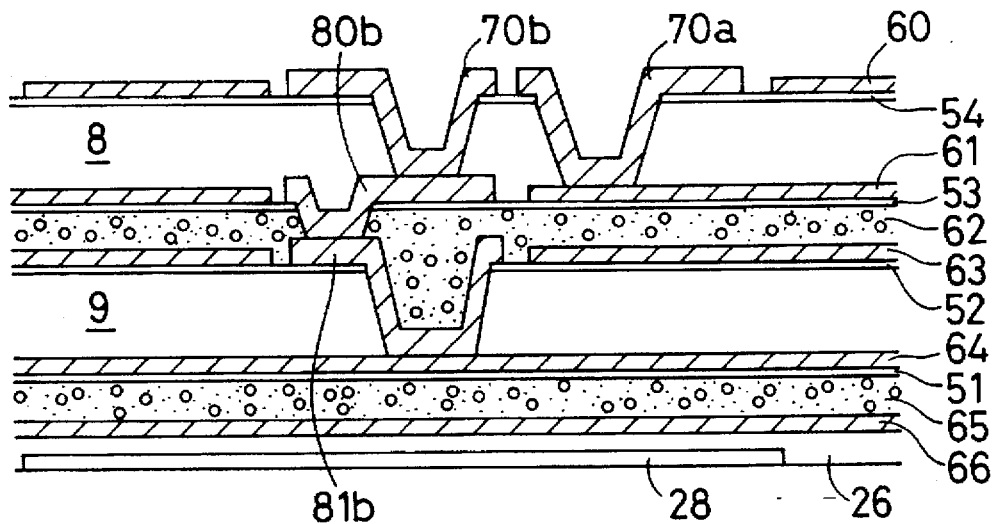

Subsequently, as shown in FIG. 15, the SiO₂ film 54 was formed on the insulating layer 8, and the counter electrode 60 was formed on the SiO₂ film 54 in the same manner as in Embodiment 1. The SiO₂ film 54 was then patterned in the same manner as in Embodiment 1 to form a mask, which was used to etch the insulating layer 8 for formation of through-holes respectively extending to the electrode pad 80b and the driving electrode 61. In the through-holes, the electrode pads 70b and 70a were formed in the same manner as in Embodiment 1.

Figure 16:
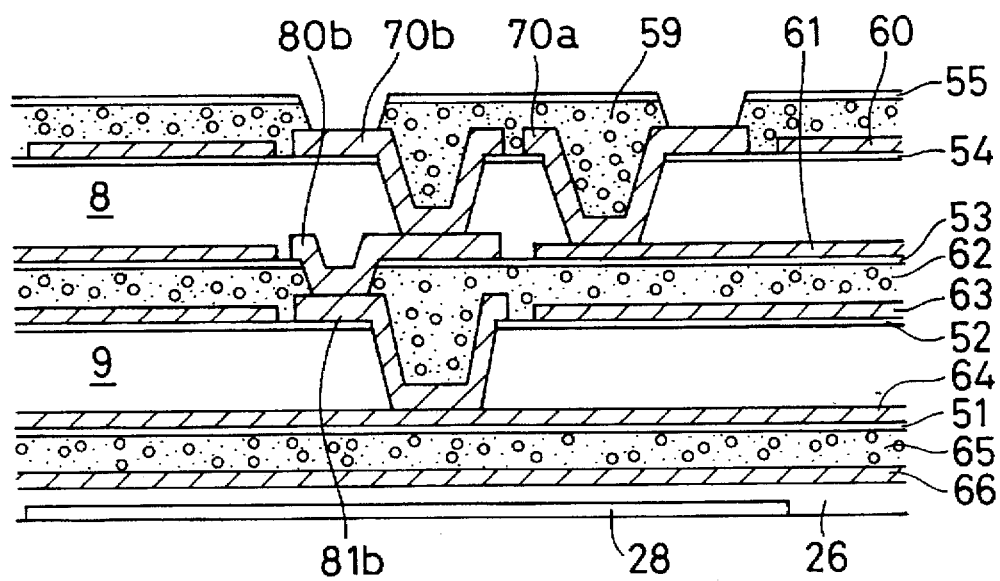
Figure 17:
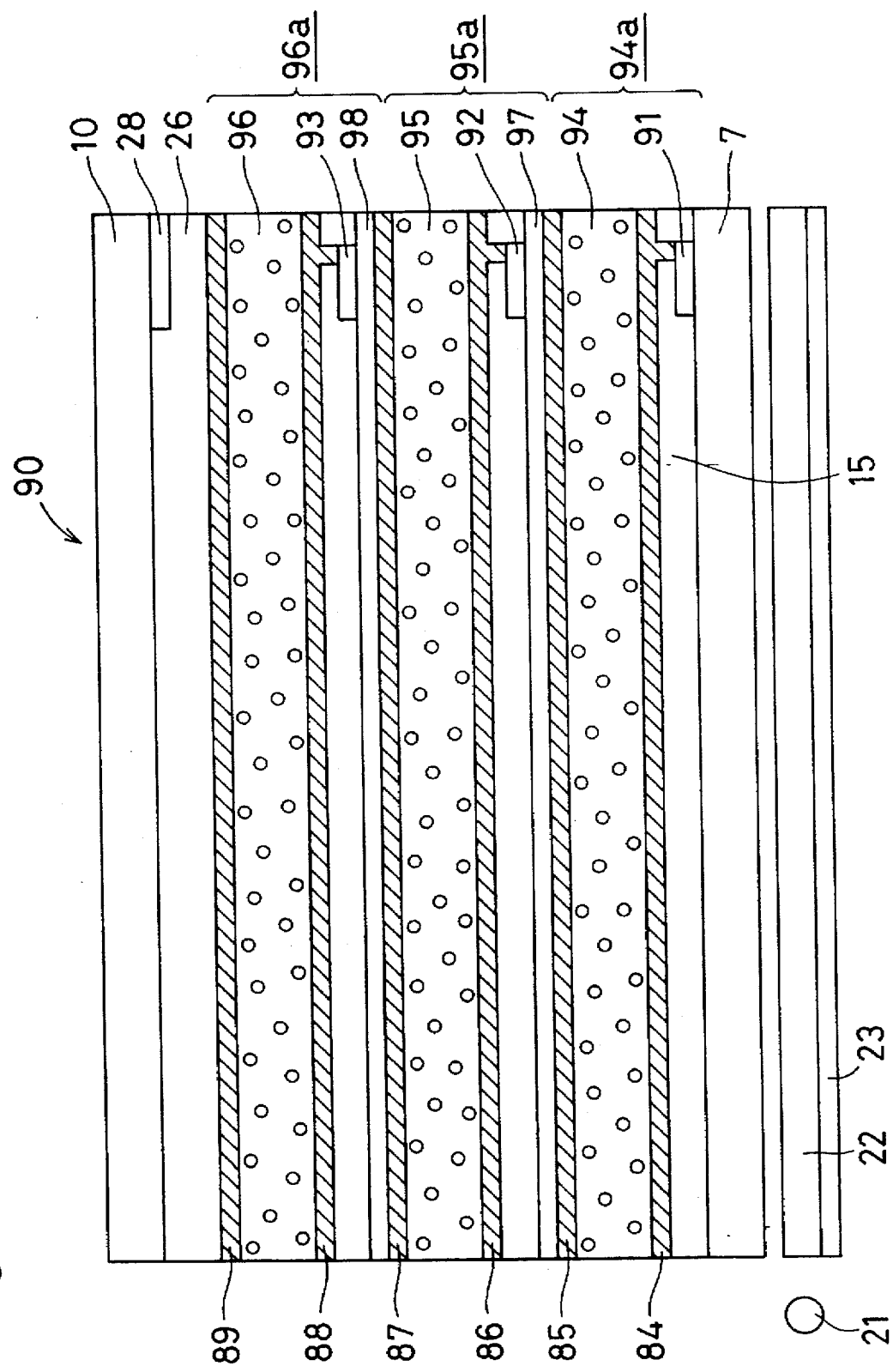
FIG. 17 is a schematic sectional view illustrating one exemplary liquid crystal display device of prior art using the subtractive color method.
Figure 18:
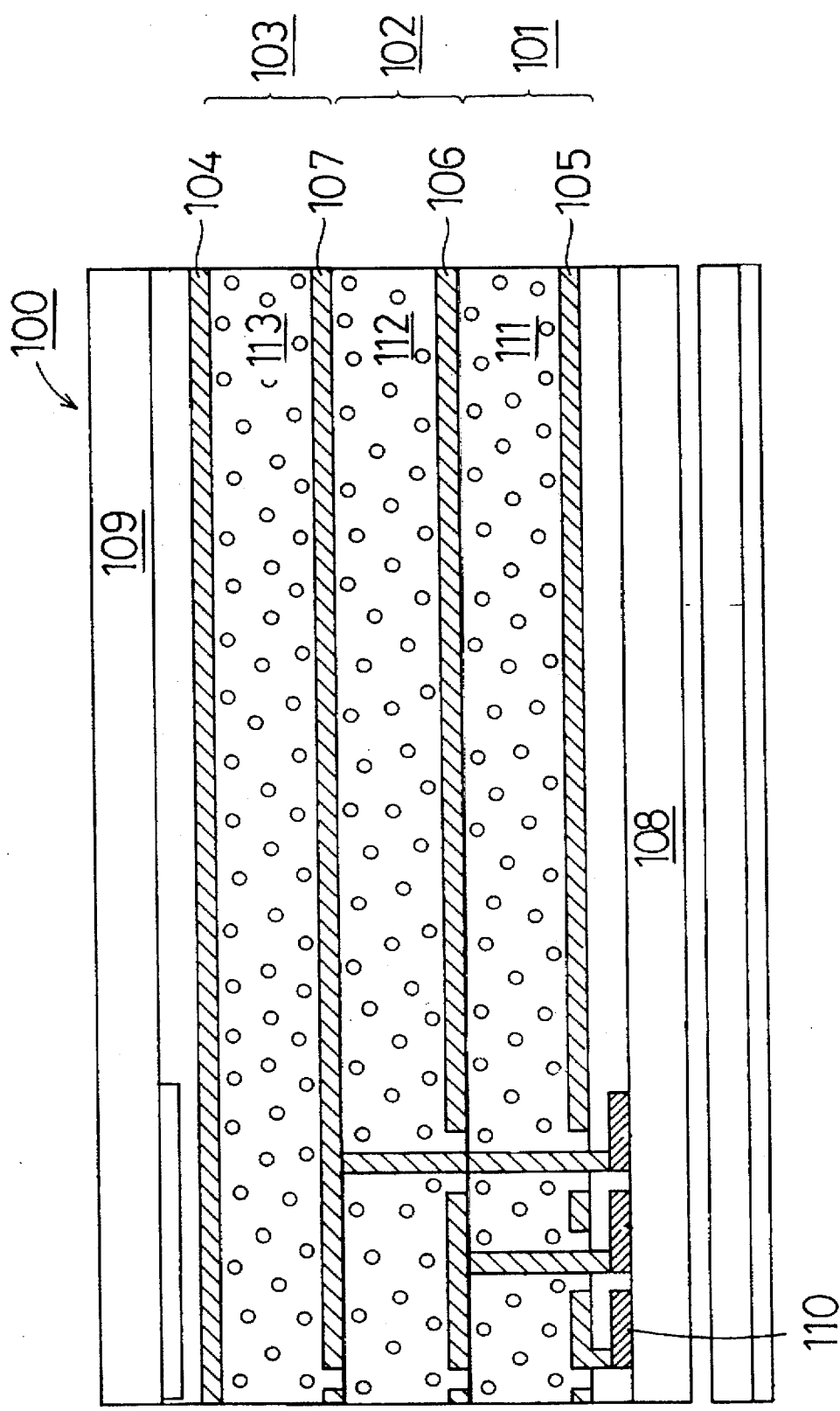
FIG. 18 is a schematic sectional view illustrating another exemplary liquid crystal display device of prior art.

Next, as shown in FIG. 16, the first liquid crystal layer 59 was formed in the same manner as for the formation of the third and second liquid crystal layers 65 and 62. Thereafter, the protective film 55 was formed on the first liquid crystal layer 59, and then through-holes were formed in the first liquid crystal layer 59 and protective film 55.

Subsequently, the electrode pads 69a and 69b were formed in the respective through-holes. The insulating film 58 was formed of a transparent acryl resin on the entire surface of the protective film 55 including the electrode pads 69a and 69b, and then patterned into a desired configuration by photolithographic and etching processes. In a region where the driving electrode was to be formed, undulation was form on the entire surface of the insulating film 58 by photolithographic and etching processes. An Al film was formed on the entire surface of the protective film 55 including the insulating film 58 and the electrode pads 69a and 69b by sputtering, and then patterned by ordinary photolithographic and etching processes to form the driving electrode 57 functioning as a scattering reflector and to form the conductive layers 68a and 68b on the electrode pads 69a and 69b, respectively. The undulation of the driving electrode 57 had an irregular pattern within the pixel so that light reflected on the reflective driving electrode 57 did not exhibit biased wavelength characteristics due to diffraction or interference.

The second substrate 10 thus formed with the third, second and first liquid crystal layers 65, 62 and 59 was bonded to the first substrate 7 having the active elements formed in the preceding step in registration therewith by using an anisotropic conductive film (designated by a reference numeral 56 in FIG. 9) so that the bumps 67a, 67b and 67c were located in predetermined positions, as shown in FIG. 10. Thus, the liquid crystal display device 50 shown in FIG. 9 was completed.

The liquid crystal display device thus obtained in this embodiment is also capable of full-color display, since the liquid crystal layers 59, 62 and 65 thereof correspond to yellow, magenta and cyan, respectively, and are driven independently by the respective TFTs 4, 5 and 6 like Embodiment 1. Since the liquid crystal layers 59, 62 and 65 each comprise particles of the GH liquid crystal dispersed in the polymer matrix, red-, green- and blue-light components of incident light are absorbed by the respective liquid crystal layers 59, 62 and 65 when no electric field is applied thereto. Further, scattered light which has not been absorbed by the GH liquid crystal particles is absorbed by the dichroic dyes present in the polymer matrix. When an electric field is applied to any of the liquid crystal layers, on the other hand, the liquid crystal portion of the liquid crystal layer is in a transmissive state, and molecules of the dichroic dye in the polymer matrix are oriented so as not to absorb light. Thus, the liquid crystal layer applied with the electric field is switched to a transmissive state. When only the TFT 6 is switched on and the TFTs 4 and 5 are switched off, for example, only the liquid crystal layer 65 is switched to a transmissive state, and the liquid crystal layers 62 and 59 absorb the green- and red-light components, respectively. Thus, only the blue-light component can be extracted to display a blue color.

In accordance with the present invention, the liquid crystal display device has the plurality of liquid crystal driving active elements formed on the first substrate and the three liquid crystal cells stacked thereon. Since the liquid crystal cells are connected in parallel and respectively connected to the corresponding liquid crystal driving active elements on the first substrate, the liquid crystal cells can be independently driven by means of a conventional active-matrix driving circuit to achieve color display by the subtractive color method. In addition, since the active elements are not provided respectively in the liquid crystal cells, there is no need to form a thick insulating layer having a strength comparable to a glass substrate. Furthermore, since at least one of the liquid crystal layers contains a liquid crystal dispersed in polymer, the liquid crystal layers can be separated from each other by thin films, not by substrates. Consequently, the thickness of the liquid crystal panel can be sufficiently reduced in comparison with the size of a pixel, thereby preventing the parallax which may otherwise occur when the display device is viewed on the skew. In addition, there is no need to provide a special driving circuit for implementing the aforesaid driving process. This suppresses an increase in fabrication cost. Moreover, the use of liquid crystal compositions containing different dyes for the respective liquid crystal layers of the liquid crystal cells makes it possible to achieve full-color display without the use of conventional color filters.

Where the connections between the respective liquid crystal cells and the liquid crystal driving active elements are achieved by stereo-interconnections extending through the respective liquid crystal cells, an area occupied by the interconnections in a pixel can be reduced, allowing the liquid crystal display device to have a high aperture ratio.

The liquid crystal display device of the present invention can be used as a reflective liquid crystal display device by employing a liquid crystal driving electrode serving as a reflector. Further, the liquid crystal display device of the present invention can be used as a transmissive liquid crystal display device by employing transparent liquid crystal driving electrodes and a back light provided below the first substrate. The light loss in color filters, which is a major factor in lowering the use efficiency of light, can be compensated and, in addition, power consumed by the back light is significantly reduced. Thus, a transmissive liquid crystal display device of a novel construction can be provided which offers low power consumption.

In the process for fabricating a full-color liquid crystal display device according to the present invention, the liquid crystal driving active elements are formed only on the first substrate. Therefore, complicated fabrication step of forming a liquid crystal driving active element on a substrate of each liquid crystal cell can be dispensed with. Moreover, since the liquid crystal driving active elements are formed only on the first substrate as described above, the circuits for driving these active elements can be mounted in the same plane, resulting in a reduced number of fabrication steps and reduced fabrication cost.

What is claimed is:

1. A liquid crystal display device comprising:
    a first substrate formed with a plurality of liquid crystal driving active elements;
    first, second and third liquid crystal cells stacked in this order on an inter-layer film formed on the first substrate; and
    a second substrate disposed on the third liquid crystal cell with intervention of a planarizing film;
    wherein the first, second and third liquid crystal cells each has a counter electrode, a liquid crystal layer and a driving electrode connected to a corresponding one of the liquid crystal driving active elements formed on the first substrate, and are each electrically isolated by an insulating layer from the counter electrode and driving electrode of an adjacent liquid crystal cell.

2. A liquid crystal display device as set forth in claim 1, wherein at least one of the liquid crystal layers of the first, second and third liquid crystal cells comprises a liquid crystal dispersed in polymer.

3. A liquid crystal display device as set forth in claim 1, wherein the liquid crystal layers in the first, second and third liquid crystal cells respectively contain different dyes.

4. A liquid crystal display device as set forth in claim 1, wherein the driving electrode of the second liquid crystal cell and the driving electrode of the third liquid crystal cell are connected to the corresponding liquid crystal driving active elements via a stereo-interconnection extending through the first liquid crystal cell and via a stereo-interconnection extending through the first and second liquid-crystal cells, respectively.

5. A liquid crystal display device as set forth in claim 1, wherein the driving electrode of the first liquid crystal cell is a reflective electrode.

6. A liquid crystal display device as set forth in claim 1, wherein the driving electrode and the counter electrode are transparent electrodes, the liquid crystal display device further comprising a light guiding plate provided on an opposite side of the first substrate to the liquid crystal cell.

7. A process for fabricating a liquid crystal display device, comprising the steps of:
    (ia) forming a plurality of liquid crystal driving active elements on a first substrate, and forming an inter-layer film on the entire surface of the first substrate including the liquid crystal driving active elements;
    (iia) forming a first driving electrode connected to a first liquid crystal driving active element formed on the first substrate, a first liquid crystal layer, and a first counter electrode in this order on the inter-layer film to form a first liquid crystal cell;
    (iiia) forming a second driving electrode connected to a second liquid crystal driving active element formed on the first substrate, a second liquid crystal layer, and a second counter electrode in this order on the first liquid crystal cell with intervention of an insulating layer to form a second liquid crystal cell; and
    (iva) forming a third driving electrode connected to a third liquid crystal driving active element formed on the first substrate, a third liquid crystal layer, and a third counter electrode in this order on the second liquid crystal cell with intervention of an insulating layer to form a third liquid crystal cell, followed by forming a planarizing film on the third liquid crystal cell and placing a second substrate on the planarizing film.

8. A process as set forth in claim 7, wherein the first driving electrode of the first liquid crystal cell is formed of a reflective conductive material.

9. A process as set forth in claim 7, wherein the first, second and third driving electrodes and the first, second and third counter electrodes are formed of a transparent conductive material, the process further comprising the step of forming a light guiding plate on an opposite side of the first substrate to the first liquid crystal cell.

10. A process for fabricating a liquid crystal display device, comprising the steps of:
    (ib) forming a plurality of liquid crystal driving active elements on a first substrate, and forming an inter-layer film on the entire surface of the first substrate including the liquid crystal driving active elements;

(iib) forming a third counter electrode, a third liquid crystal layer, and a third driving electrode in this order on a second substrate with intervention of a planarizing film to form a third liquid crystal cell;

(iiib) forming a second counter electrode, a second liquid crystal layer, and a second driving electrode in this order on the third liquid crystal cell with intervention of an insulating layer to form a second liquid crystal cell;

(ivb) forming a first counter electrode, a first liquid crystal layer, and a first driving electrode in this order on the second liquid crystal cell with intervention of an insulating layer to form a first liquid crystal cell; and (vb) bonding the resulting first and second substrates together such that the first, second and third driving electrodes are respectively connected to the corresponding liquid crystal driving active elements.

11. A process as set forth in claim 10, wherein the first driving electrode of the first liquid crystal cell is formed of a reflective conductive material.

12. A process as set forth in claim 10, wherein the first, second and third driving electrodes and the first, second and third counter electrodes are formed of a transparent conductive material, the process further comprising the step of providing a light guiding plate on an opposite side of the first substrate to the first liquid crystal cell.

* * * * *